M. BLASIUS.
VEHICLE SIGNAL.
APPLICATION FILED JUNE 13, 1917.
1,263,195.
Patented Apr. 16, 1918.
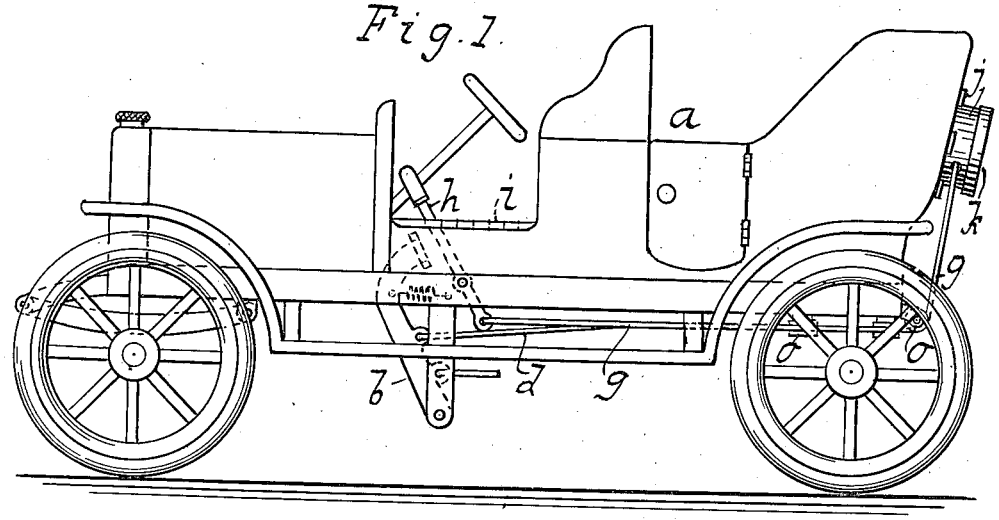
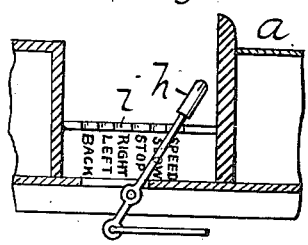
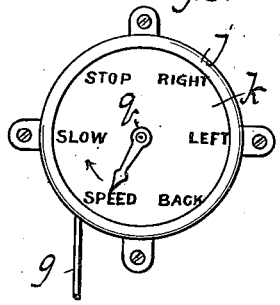
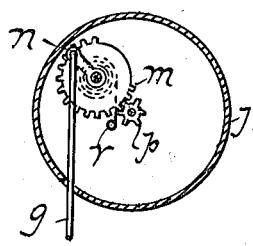
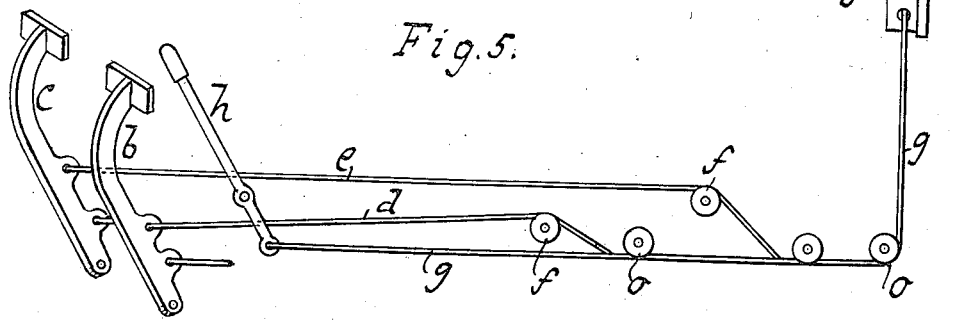
INVENTOR
Michael Blasius
BY
Hauff & Barland
ATTORNEYS

UNITED STATES PATENT OFFICE.

MICHAEL BLASIUS, OF UNION HILL, NEW JERSEY.

VEHICLE-SIGNAL.

1,263,195.  Specification of Letters Patent.  Patented Apr. 16, 1918.

Application filed June 13, 1917. Serial No. 174,465.

*To all whom it may concern:*

Be it known that I, MICHAEL BLASIUS, a citizen of the United States, residing at Union Hill, in the county of Hudson and State of New Jersey, have invented new and useful Improvements in Vehicle-Signals, of which the following is a specification.

This invention relates essentially to that class of signals which can be mounted on the rear portion of a vehicle, where it will be visible to the drivers of following vehicles. The present invention is an improvement on my U. S. Patent No. 1,232,190, granted July 3rd, 1917.

The invention is designed to provide means within reach of the driver to operate a signal denoting the different directions in which the vehicle is traveling. The device is utilized, for example, when it is intended to turn corners also when going ahead at full or slow speed, and a reverse movement when going backward.

The object of the invention is to provide a lever for actuating an indicator arm to point to different inscriptions on a dial and thus exhibit the intention to change the speed or steer the vehicle in an opposite direction.

The novel combinations of the invention are more fully described in the following specification and claims.

Referring to the accompanying drawing in which:—

Figure 1 represents a side elevation of an automobile embodying this invention.

Fig. 2 is a detail section showing the position of the hand lever.

Fig. 3 is a front elevation of a dial and casing.

Fig. 4 is a sectional front elevation of the same.

Fig. 5 is a diagram showing the connections between the indicator arm and the levers.

In this drawing the letter $a$ designates an automobile having an ordinary clutch pedal lever $b$ and a brake lever $c$, both being within reach of the car operator's foot. A flexible cable or chain $d$ is connected to the clutch lever for controlling the speed of the vehicle. Another chain or cable $e$ is connected to the brake lever $c$ for stopping the travel of the car. Both cables are guided over idler rollers $f$ connected to the frame or chassis of the car.

These two cables branch from or are attached to a main cable $g$ connected to a hand lever $h$ fulcrumed to the side of the frame. The shank or stem of the lever is adapted to engage notches $i$ fixed to the side of the frame, so as to hold the lever in different positions.

A casing $j$ is secured to the rear body portion of the car and it is provided with a dial $k$ having the following inscriptions theron: "Speed" "Slow" "Stop" "Right" "Left" and "Back," in the order named. In the casing is mounted a gear $m$ with a lever $n$ fixed to it. To the end of this lever is connected one end of the main cable $g$, while the other end of the cable is secured to the hand lever. The cable is guided over rollers $o$ mounted on the bottom and back of the frame. The gear $m$ engages a pinion $p$ carrying a rotary arm or hand $q$ made to normally point to the word "Speed" on the dial. The gear $m$ is about three times the diameter of the pinion, so that when the gear is actuated, it will practically rotate the indicator arm a complete revolution about the axis of the dial. A coiled spring $r$ coiled about the fulcrum of the gear will restore the indicator arm to its normal position.

Either of the flexible connections $e$ or $d$ respectively can be fixed in any desired position relative to the fulcrum and power of the pedal levers so as to give more or less motion to the indicator arm. In view of the fact that the cable $e$ is attached a greater distance from the fulcrum than the other cable, it will swing the indicator arm a greater distance to point to the word "Stop," while the same movement of the lever $b$ will swing the arm to the word "Slow."

When the lever $h$ is operated, it will oscillate the indicator arm to any one of the designations on the dial depending on how far the lever has been swung. Each notch $i$ represents one of the words on the dial showing the driver to which word the indicator has been moved. It will be seen that when the lever $h$ is manipulated, the indicator will initially swing to the word "Slow," then to the word "Stop" and so on until the desired word is reached.

When the device is attached to an ordinary vehicle without a motor, the pedal levers can be omitted and the main cable operated by the hand lever.

I claim:—

1. A vehicle signal comprising a dial with inscriptions thereon, an indicator arm having a pinion mounted to revolve about the axis of the dial to any of the inscriptions, a gear lever made to engage the pinion for oscillating the indicator arm, a lever connected to the gear lever to transmit rotary motion to the indicator arm, and a spring mounted on the fulcrum of the gear lever to retrograde the indicator arm.

2. A vehicle signal comprising a dial with the words "Speed," "Slow," "Stop," "Right," "Left," and "Back" inscribed thereon, an indicator arm having a pinion mounted to revolve about the axis of the dial to any of the inscriptions but normally set at speed, a gear lever made to engage the pinion for oscillating the indicator arm, a lever swingingly mounted within reach of an operator, a flexible connection between the swinging lever and the gear lever.

In testimony whereof I have hereunto set my hand in the presence of two subscribing witnesses.

MICHAEL BLASIUS.

Witnesses:
WILLIAM MILLER,
GRACE DE VOE.